(12) United States Patent
Barnett et al.

(10) Patent No.: US 10,842,075 B2
(45) Date of Patent: Nov. 24, 2020

(54) CROP CONVERGENCE SYSTEM FOR ROTARY MOWER

(71) Applicant: MacDon Industries Ltd., Winnipeg (CA)

(72) Inventors: Neil Barnett, Waunakee, WI (US); Konstantin Kolegaev, Winnipeg (CA); Matthew James Stephens, Niverville (CA)

(73) Assignee: MacDon Industries, Winnipeg (CA)

( * ) Notice: Subject to any disclaimer, the term of this patent is extended or adjusted under 35 U.S.C. 154(b) by 167 days.

(21) Appl. No.: 16/031,689

(22) Filed: Jul. 10, 2018

(65) Prior Publication Data

US 2020/0015414 A1 Jan. 16, 2020

(51) Int. Cl.
| A01D 34/66 | (2006.01) |
| A01D 43/10 | (2006.01) |
| A01D 34/73 | (2006.01) |
| A01D 34/76 | (2006.01) |
| A01D 34/71 | (2006.01) |

(52) U.S. Cl.
CPC ......... *A01D 34/664* (2013.01); *A01D 34/662* (2013.01); *A01D 34/668* (2013.01); *A01D 34/71* (2013.01); *A01D 34/736* (2013.01); *A01D 34/76* (2013.01); *A01D 43/10* (2013.01)

(58) Field of Classification Search
CPC ...... A01D 34/664; A01D 34/71; A01D 34/76; A01D 34/736; A01D 43/10; A01D 34/668; A01D 34/662
See application file for complete search history.

(56) References Cited

U.S. PATENT DOCUMENTS

| 5,430,997 A * | 7/1995 | O'Halloran | A01D 34/80 56/10.2 H |
| 5,433,064 A * | 7/1995 | Schmitt | A01D 34/667 56/13.9 |
| 5,768,865 A * | 6/1998 | Rosenbalm | A01D 34/667 56/13.6 |
| 6,158,201 A * | 12/2000 | Pruitt | A01D 43/10 56/13.9 |
| 7,340,876 B1 * | 3/2008 | Barnett | A01D 34/71 56/153 |
| 7,461,498 B1 * | 12/2008 | Barnett | A01D 57/30 56/192 |

(Continued)

*Primary Examiner* — Arpad Fabian-Kovacs
(74) *Attorney, Agent, or Firm* — Miller Canfield

(57) ABSTRACT

In a rotary mower having ten generally horizontal cutter disks forming a total cutting length along the cutter bar of 16 feet, the discharge opening containing the parallel conditioner rolls and a parallel transfer roll has a width of at least 125 inches. This allows a first outermost one of the ten disks and approximately one half of the next adjacent disk to be mounted on the cutter bar outwardly of the discharge opening. A convergence system then includes only first and second impellers with the first impeller mounted on the first disk for rotation therewith and the second impeller mounted on an upper support above the impeller so that the second impeller hangs downwardly toward the second disk for contacting the cut crop and mounted immediately adjacent with the second impeller having a peripheral edge located at or immediately adjacent the vertical plane of the side of the discharge opening.

15 Claims, 4 Drawing Sheets

(56) References Cited

U.S. PATENT DOCUMENTS

| | | | | |
|---|---|---|---|---|
| 7,536,846 | B1 * | 5/2009 | Pruitt | A01D 34/664 56/13.6 |
| 8,656,694 | B2 * | 2/2014 | Pruitt | A01D 43/105 56/10.6 |
| 2002/0189218 | A1 * | 12/2002 | Rosenbalm | A01D 43/10 56/6 |
| 2005/0126141 | A1 * | 6/2005 | Eubanks | A01D 34/664 56/6 |
| 2005/0126142 | A1 * | 6/2005 | Rosenbalm | A01D 34/73 56/6 |
| 2008/0066441 | A1 * | 3/2008 | Barnett | A01D 34/668 56/14.7 |
| 2009/0071116 | A1 * | 3/2009 | Barnett | A01D 34/668 56/153 |
| 2009/0158699 | A1 * | 6/2009 | Pruitt | A01D 34/665 56/6 |
| 2010/0269475 | A1 * | 10/2010 | Barnett | A01D 34/668 56/157 |
| 2011/0005181 | A1 * | 1/2011 | Barnett | A01D 34/664 56/157 |
| 2011/0146219 | A1 * | 6/2011 | Pruitt | A01D 61/004 56/157 |
| 2012/0031064 | A1 * | 2/2012 | Barnett | A01D 34/668 56/157 |
| 2014/0102067 | A1 * | 4/2014 | Barnett | A01D 34/71 56/16.4 C |
| 2016/0183455 | A1 * | 6/2016 | Pruitt | A01D 34/664 56/157 |
| 2016/0183456 | A1 * | 6/2016 | Olander | A01D 82/02 56/157 |

* cited by examiner

CROP CONVERGENCE SYSTEM FOR ROTARY MOWER

This invention relates to a crop harvesting header which has a cutter bar across the width of the header which carries and drives a plurality of transversely spaced rotary disks and particularly to an improved arrangement for converging the cut crop inwardly from outer disks to a discharge opening.

BACKGROUND OF THE INVENTION

Crop harvesting headers which use rotary cutters in replacement for the more conventional sickle knife systems have been available for many years. It is well known that such rotary cutters include a cutter bar or gear train which provides the main structural and drive communication components of the cutter. The cutter bar provides a series of longitudinally spaced vertical drive members each of which drives a respective one of a plurality of cutting disks at spaced positions along the cutter bar. The disks are mounted for rotation about a vertical axis standing upwardly from the cutter bar. The disks carry at a point on their outer edge a plurality, generally two, of flail type blades which rotate with the disk around the vertical axis in a cutting action.

The construction of the cutter bar itself including the suitable gear train is well known and a number of different designs are available which can be used by a person skilled in this art.

In many cases the discharge opening contains a conditioner for engaging and breaking or fracturing the crop to improve drying action as the swath is left in the field. Such conditioners can be of a number of different types but one common type uses a pair of fluted rollers which form a nip so that the crop is bent as it passes between the flutes.

SUMMARY OF THE INVENTION

It is one object of the invention to provide a crop harvesting header of the type having a series of rotary cutting disks on a cutter bar.

According to the invention there is provided a crop harvesting header comprising:

a header frame arranged to be transported across ground on which there is a standing crop for harvesting;

a cutter bar mounted on the header frame across a width of the header for movement across the ground in a forward working direction for harvesting the standing crop;

ten generally horizontal cutter disks mounted on the cutter bar at positions spaced transversely of the header with the disks being mounted on the cutter bar for driven rotation about respective generally upright axes spaced along the cutter bar;

each disk comprising a central hub fastened by a plurality of bolts lying in a hub circle and a shield plate carried by the central hub;

each disk being generally elliptical in plan to define a longer axis and a shorter axis across the disk and having mounted thereon at ends of the longer axis thereof a respective one of a pair of cutter blade such that rotation of the disk about its upright axis defines a cutting circle and causes a standing crop to be cut by the blades;

the cutter disks providing a total cutting length along the cutter bar of 16 feet;

the header frame defining a discharge opening through which the cut crop is discharged for forming a swath behind the header;

the discharge opening being defined by two parallel, spaced end walls each lying in a vertical plane parallel to the forward direction with an opening between the two end walls;

a conditioning system comprising two parallel conditioner rolls defining a conditioning nip and a parallel transfer roll in front of the conditioning nip mounted within the discharge opening;

the conditioner rolls and the transfer roll being coextensive so that each has an end at a respective one of the end walls;

at each end of the header frame there being arranged:

a first outermost one of the ten disks mounted on the cutter bar outwardly of the discharge opening;

a second next adjacent one of the ten disks being mounted on the cutter bar with the vertical plane of the respective end of the discharge opening intersecting the hub circle of said second disk;

and a crop transfer impeller arrangement transferring the cut crop from the first disk to the discharge opening comprising only first and second impellers:

the first impeller mounted on the first disk for rotation therewith about the respective upright axis thereof for contacting the cut crop such that crop cut thereby is carried inwardly in front of the first impeller toward the discharge opening;

the second impeller mounted on an upper support above the impeller so that the second impeller hangs downwardly toward the second disk for contacting the cut crop, the second impeller being driven for rotation about an upright axis thereof for contacting the cut crop such that crop cut thereby is carried inwardly in front of the second impeller toward the discharge opening;

the first and second impellers being arranged immediately adjacent without an intervening transport element or intermediate impeller such that the crop material is transferred directly from the first impeller to the second impeller and is transferred directly from the second impeller to the discharge opening;

wherein the second impeller has a peripheral edge located at or immediately adjacent the vertical plane;

and wherein a width of the discharge opening is greater than 110 inches. This may be typically of the order of 110 to 130 inches.

Preferably the second disk has the upright axis thereof within 2.0 inches of the vertical plane.

Preferably the second impeller has a tangent to the peripheral edge thereof within 1.0 inches of the vertical plane and preferably around 0.6 inches.

Preferably the second impeller has a tangent to the peripheral edge thereof lying in the vertical plane.

Preferably the second impeller has a tangent to the peripheral edge thereof forward of a plane containing the upright axes of the disks.

Preferably the second impeller has a tangent to the peripheral edge thereof forward of an upright plane containing a front tangent to the hub circles.

Preferably the second impeller has the upright axis thereof overlying the second disk with a portion of the second impeller overlying the cutting circle of the first disk.

Preferably the second impeller has a larger diameter than the first impeller.

Preferably the second impeller has its upright axis behind that of the first impeller.

Preferably there is provided an upstanding rear wall behind the first and second impellers which interconnects with the end wall of the discharge opening at a corner and wherein the rear wall includes a recessed portion behind the second impeller which is located rearward of a portion of the rear wall behind the first impeller.

Preferably each of the first and second impellers comprises a cylindrical wall with a plurality of angularly spaced ribs thereon parallel to the upright axis thereof.

The conditioner defined herein may be or the type using a pair of fluted rollers defining a nip. However other types of conditioner can also be used. Also in some cases the header can be used without a conditioner so that the crop material is deposited directly onto the ground or collected.

While in most cases it is desirable to carry out conditioning of the crop in the discharge opening, in some case no conditioning of the crop is required on the header so that the crop is merely transferred by the auger elements to the discharge opening and is deposited in the discharge opening into a swath without utilizing any conditioning elements within the discharge opening. The swath may be converged within the discharge opening using the arrangement shown in US Published Application 2009/0071116 filed Jul. 23, 2008 and published Mar. 23, 2008 which corresponds to Canadian application 2,639,032. The disclosure of the components in the discharge opening of this application are incorporated herein by reference.

The frame as defined herein can include both structural beams and other such frame elements and may also include panels and sheets which do not contribute to the structural strength of the header.

BRIEF DESCRIPTION OF THE DRAWINGS

In the drawings like characters of reference indicate corresponding parts in the different figures.

DETAILED DESCRIPTION

Figure 1:
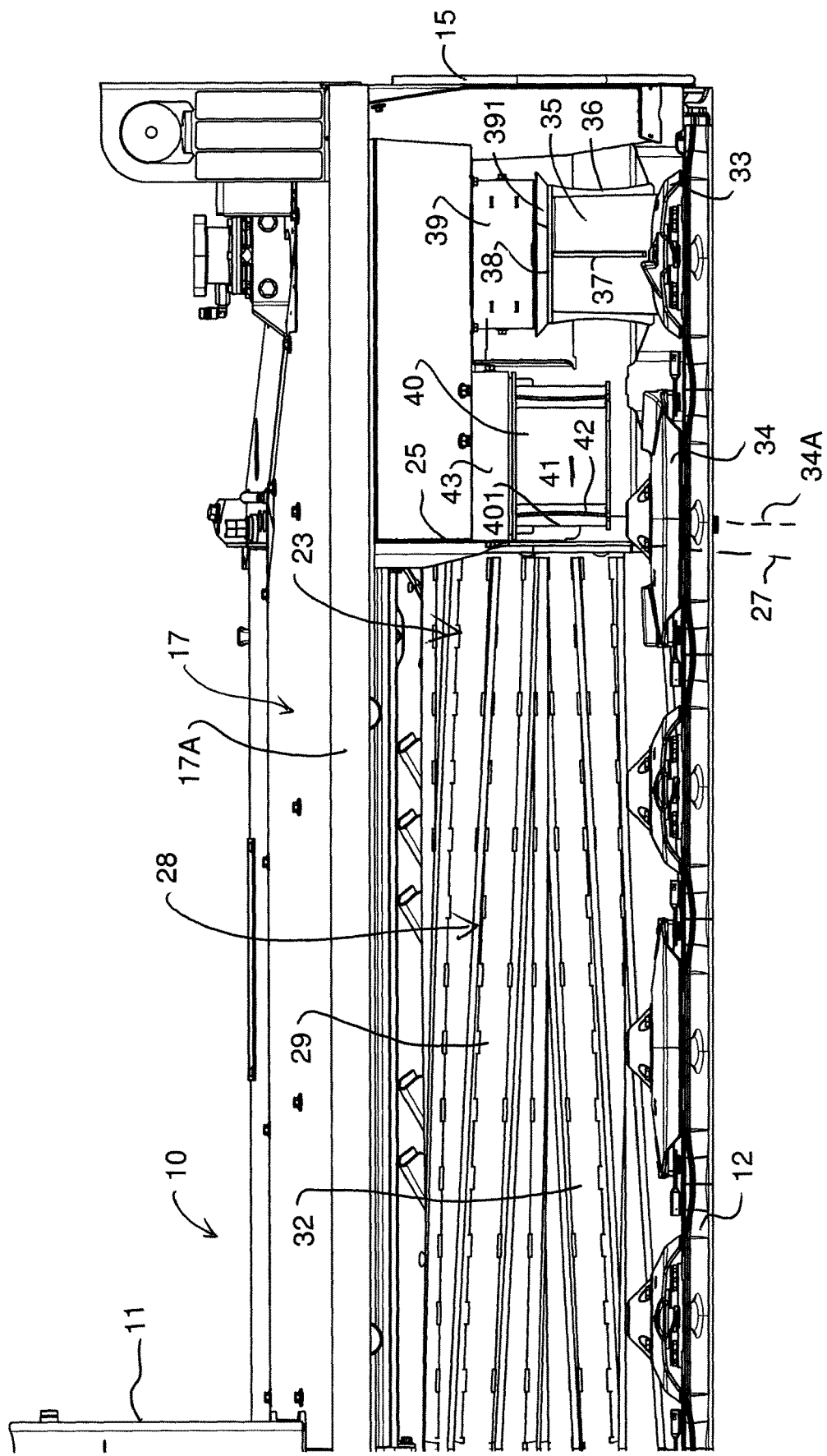
FIG. 1 is a front elevational view of one half only of a header according to the present invention where the opposed half is symmetrical.

In FIG. 1 is shown schematically a header 10 for attachment to conventional swather tractor of the well-known type having driven ground wheels and rear castor wheels to form a self-propelled swather using rotary disks for the cutting action.

A front support assembly including a link 11 of the tractor carries the header 10 including left and right lift arms (not shown) which carry the header in a floating action across the ground along skid plates on an underside of a cutter bar 12 of the header. The header includes side walls 15 forming part of a frame 17 attached to the conventional transport system of the tractor. The frame carries top covers 18 which support a front skirt 19A in front of the cutter bar.

The frame 17 includes a main transverse beam 17A which is attached to the tractor. The main beam carries the side walls 15. The side walls each comprises a vertical wall extending forwardly to a front edge 18 in front of the cutter bar 12. The side wall is vertical and the front edge 18 lies in a vertical plane of the side wall so as to confine crop material to the interior of the header between the side walls for cutting action effected by the cutter bar 12.

Figure 3:
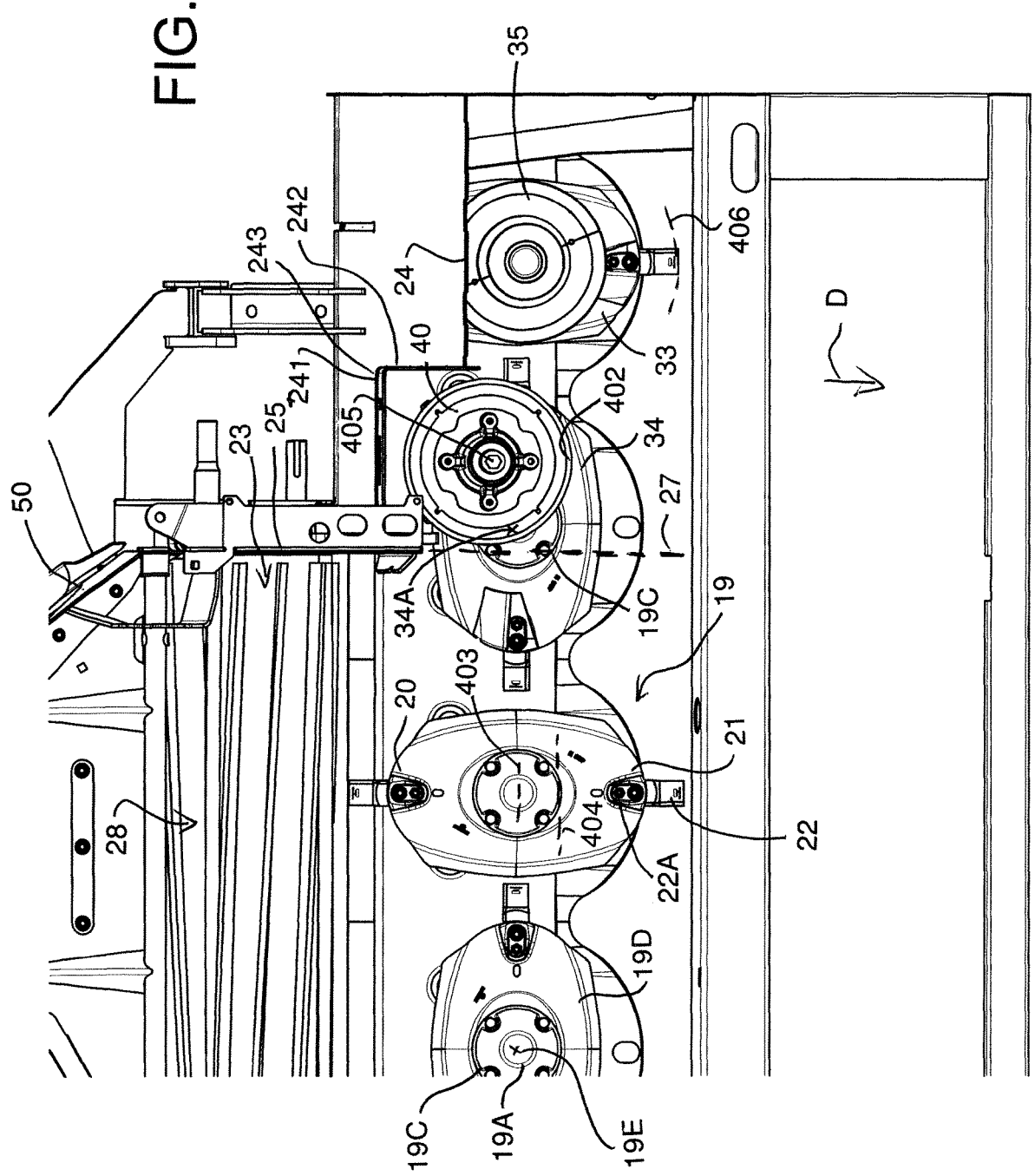
FIG. 3 is a top plan view of on an enlarged scale of the header of FIG. 1 showing only the converging section at one end of the discharge opening.
Figure 4:
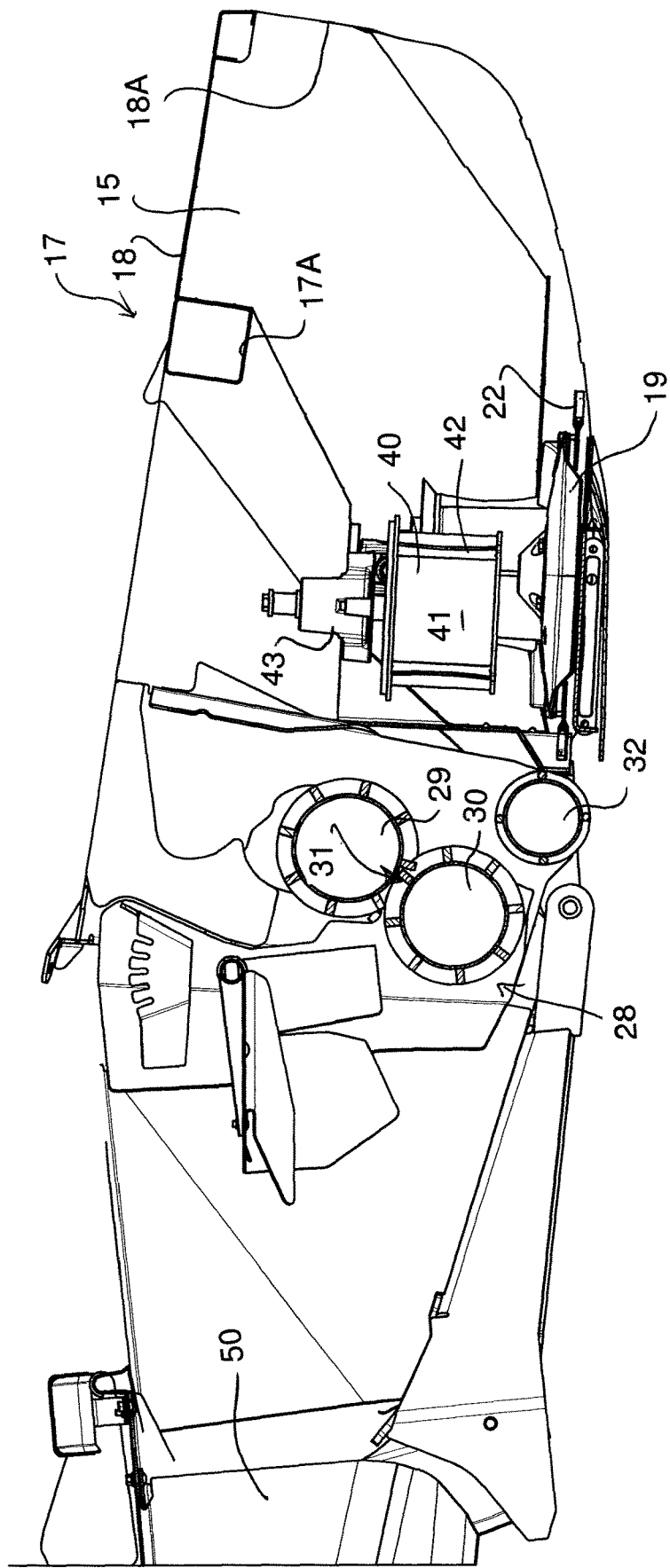
FIG. 4 is a cross-sectional view along the lines 4-4 of FIG. 1.

Within the cutter bar 12 is provided a gear train (not shown) of meshing gears carried on suitable bearings so as to provide communication of drive of a number of vertical shafts carried on the cutter bar each for rotating a generally horizontal disk 19 about a vertical axis of the shaft. The disks 19 best shown in FIG. 3 are substantially identical. The disks are generally elliptical in shape so that a length between two ends 20 and 21 is significantly greater than a distance between the side edges in a direction at right angles to the length. At each of the ends 20 and 21 is mounted a respective one of a pair of flails 22 each for pivotal movement about a flail mounting pin 22A. The mounting pins are arranged at the ends and thus at the maximum extent of the disk so that the flails project outwardly beyond the edges of the disk for rotation in a common horizontal cutting plane generally parallel to the plane of the cutter bar in a cutting action.

Each disk 19 comprises a central hub 19A fastened by a plurality of bolts lying in a hub circle 19C surrounding the center axis 19E of rotation of the disk. A shield plate 19D is carried by the central hub 19A and mounts the blades 22 at the outer edge of the shield. This construction is well known and the above features are defined so as to establish locations on the disk for identifying other components of the system relative to the disk.

The disks 19 are intermeshed so as to driven synchronously and they are arranged at 90° phase difference so that adjacent pairs of the disks are at 90° offset as they rotate to avoid interference between the disks and the blades 22 carried thereby.

The cutter bar of this general construction is of a conventional nature and many examples of a commercial arrangement of this type are available in the market place. Thus the details of the cutter bar and its mounting are well known to one skilled in the art and further details can be obtained from such commercial devices.

The cutter bar 12 is wider than a discharge opening 23 with an entrance mouth defined in a back sheet 24 forming a vertical rear panel of the header behind the cutter bar 12. The discharge opening is defined by two parallel, spaced end walls 25 each lying in a vertical plane 27 parallel to the forward direction D with the opening formed between the two end walls 25.

A conditioning system 28 is mounted in the discharge opening 23 comprising two parallel conditioner rolls 29, 30 defining a conditioning nip 31 and a parallel transfer roll 32 in front of the conditioning nip mounted within the discharge opening 23. The conditioner rolls and the transfer roll are coextensive so that each has an end at a respective one of the end walls 25.

Thus the crop material passes over and between the disks when cut and also must be converged from the full cut width into the entrance mouth of the discharge opening 23.

The discharge opening 23 has side walls 25 which are vertical and parallel and extend rearwardly from the mouth of the opening and which confine the crop material to pass through the discharge opening over a width less than the width of the header so that the side walls 25 are spaced inwardly from the respective end walls 15 of the header. The crop conditioning system 28 is arranged to span the width of the crop discharge opening so that the width of the conditioning system is equal to the width of the discharge opening. The conditioning system comprises the top roller 29 and a bottom roller 30 which have flutes arranged in a meshing arrangement so that the crop material passing through the discharge opening passes through the nip 31 between the conditioning rolls and is discharged from the rear of the conditioning system as a swath of material to be discharged onto the ground or to be collected as required.

The disks 19 mounted on the cutter bar 12 include a series of six disks which are located in front of the discharge opening 23. Outward of these disks and either side is provided two outer disks indicated at 33 and 34 with the disk 33 outermost. These disks are arranged to rotate inwardly as indicated by arrows D so that the front extremity and the blade carried thereby rotates in the direction indicated at the arrows D1 as shown in FIG. 3 to carry the crop material which is cut by those disks inwardly toward the discharge opening.

The disk 33 only and not disk 34 carries an impeller 35 mounted on the disk so as to be carried by the disk and driven by the disk and so as to be directly co-axial with the disk 33. The impeller 35 comprises a cylindrical wall 36 with a plurality of angularly spaced ribs 37 thereon parallel to the upright axis thereof. The impeller 35 turns with the disk 33 to which it is attached in the inward direction so as to carry the crop across the front surface of the impeller. The impeller has a diameter measured at the outside of the ribs 37 which is less than that of the disks and typically of the order of 8-10 inches. The impeller has a top edge 38 above the disk and underneath a top member 39 is a stationary shield 391 in front of the drive line to prevent crop from entering. Directly below the shield there is a flange with a labyrinth between the stationary and turning components to make crop entry difficult.

A hanging impeller 40 is located inwardly of the impeller 35 so that the two impellers co-operate to carry the crop material inwardly toward the discharge opening 23 and to resist the crop material from moving rearwardly over the disks 19 to the rear bulkhead panel 24 which could cause collection of the crop material and eventual blockage of the system.

The impeller 40 is of similar construction as that of the impeller 35 with an outer cylindrical surface 41 and longitudinal ribs 42. The impeller is mounted on an overhead drive member 43 including drive mechanism such as a motor 44 or belt drive. The top surface 45 of the impeller 40 is located above the top surface of the impeller 35 and the bottom surface 46 is below the top surface of the impeller 35 but above the bottom surface of the impeller 35 at the disk.

The impeller 40 has a diameter at the ribs or the order of 11.5 inches which is approximately equal to but slightly larger than that of the impeller 35. Both impellers have height of the order of 6.5 inches.

In the ten disk mower, in front of the discharge opening there are located six of the cutter disks arranged in four pairs of disks with each pair arranged to rotate in opposite directions such that the crop tends to pass between the pair of disks.

The disk 33 is located wholly outside the plane 27. The disk 34 is located such that the plane 27 intersects the disk 34 at a position closely adjacent the center axis 34A of the disk. The plane 27 passes approximately within 2.0 inches of the axis 34A of the disk 34 and more preferably around 1.9 inches so that the plane thus intersects the hub circle 19C of the disk 34. The whole of the disk 33 thus lies outside the plane and slightly more than half of the disk 34 lies outside the plane.

The converging system at the end of the cutter bar at the disks 33 and 34 is formed wholly by the first and second impellers 35, 40. These are thus arranged immediately adjacent one another with no intervening transport element or intermediate impeller such that the crop material is transferred directly from the first impeller 35 to the second impeller 40 and is transferred directly from the second impeller to the discharge opening 23. There are no additional components operating the transfer the crop inwardly. The wide width of the discharge opening allows the second impeller to be located immediately adjacent the plane at the edge of the discharge opening. This ensures that crop is carried inwardly at a position well forward of the rear wall 24.

Thus the second impeller 40 has a peripheral edge 401 or tangent at the inside edge or three o'clock position on the impeller located at or immediately adjacent the vertical plane 27. This geometry is obtained by selecting a wide width of the discharge opening where the width of the discharge opening is at least 120 inches and preferably of the order of 130 inches. This compares to a total cutting width of the cutter bar which is 16 feet or 192 inches so that the length of the cutter bar outside the plane 27 is only 32 inches. This also generates a geometry where the second disk 34 has the upright axis 34A thereof within 2.0 inches of the vertical plane 27. While the second impeller 40 preferably has a tangent to the peripheral edge lying in the vertical plane 27, the geometry may be moved to a positon where the tangent is moved slightly outwardly of the plane 27 to that it is located within 1.0 inches of the vertical plane.

The geometry also allows the second impeller 40 to be moved forwardly so that the second impeller 40 has a tangent 402 to the peripheral edge thereof at the 12 o'clock positon forward of a plane 403 containing the upright axes 19E of the disks 19 and typically forward of an upright plane 404 containing a front tangent to the hub circles.

This geometry also positions the second impeller 40 so that it has the upright axis 405 thereof overlying the second disk 34 with a portion of the second impeller 40 overlying the cutting circle 406 of the first disk.

Figure 2:
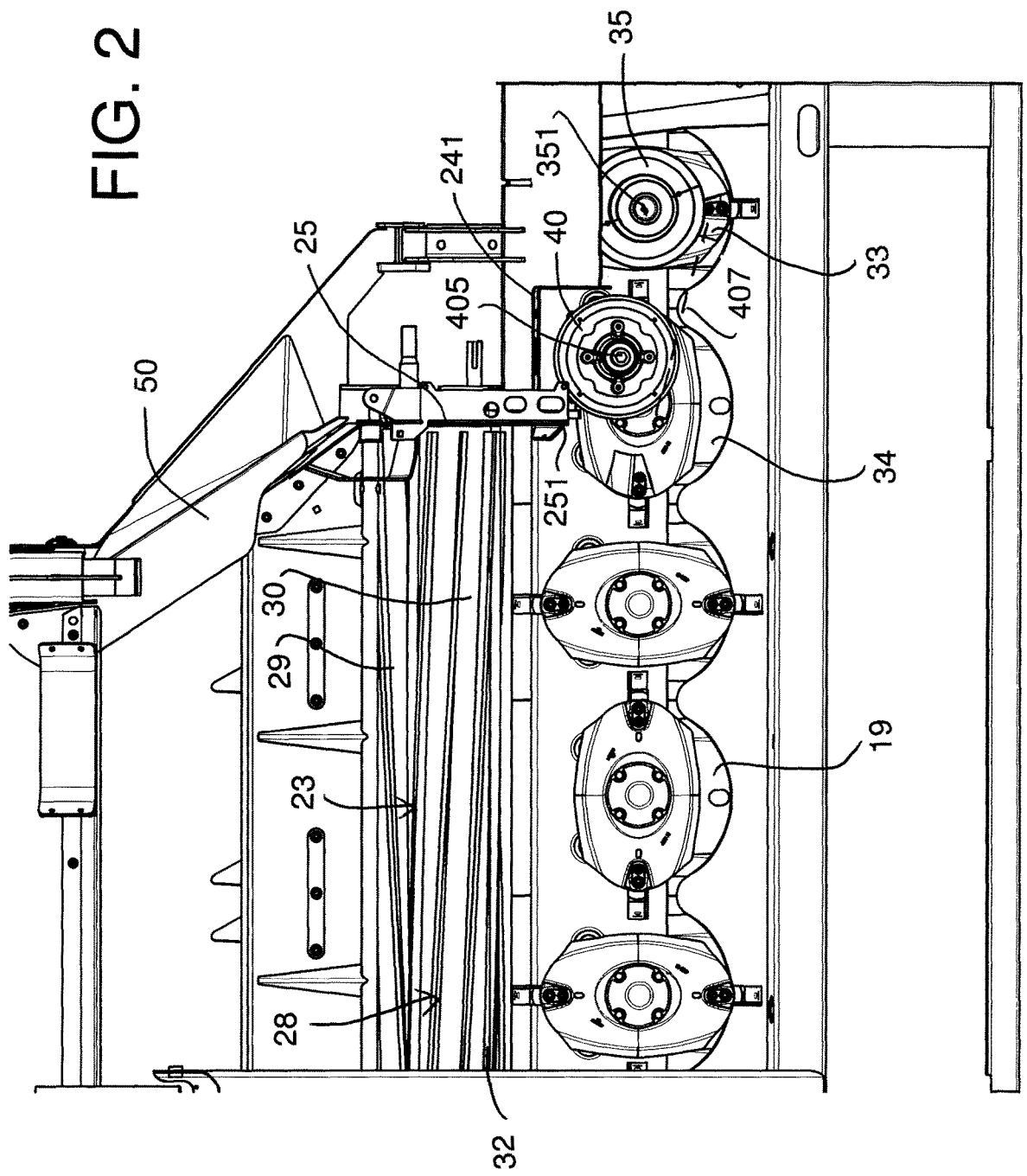
FIG. 2 is a top plan view of one half of the header of FIG. 1 where the opposed half is symmetrical.

In order to provide an effective transfer of the crop, the second impeller 40 has a larger diameter than the first impeller 35. This is typically only a slight different of diameter but this construction moves the front face of the second impeller forward to better carry the crop inwardly to the opening 23. However, to direct the crop along a line of transfer indicated at 407 (FIG. 2), which is inclined inwardly and rearwardly, the second impeller 40 has its upright axis 405 behind the axis 351 of the first impeller 35 and therefore behind the plane 403 containing the upright axes 19E of the ten disks 19.

The upstanding rear wall 24 behind the first and second impellers 35, 40 which interconnects with the end wall 25 of the discharge opening at a corner 251 and the rear wall 24 includes a recessed portion 241 with a side wall 242 and a rear wall 243 behind the second impeller 40 which is located rearward of a portion of the rear wall 24 behind the first impeller 35. This allows the second impeller 40 to be located in the position rearward of the first impeller 35 as discussed above.

In view of the increased width of the discharge opening 23, it is necessary that there are provided swath guide members 50 arranged to reduce the width of the swath from the width of the discharge opening of at least 120 inches and preferably as much as 129 inches to a swath width of no more than 120 inches. In this way, the requirement to converge the crop after the conditioning rollers is increased relative to conventional systems in view of the increased width of the discharge opening 23.

The invention claimed is:
1. A crop harvesting header comprising:
a header frame;

a cutter bar mounted on the header frame across a width of the header;
ten generally horizontal cutter disks mounted on the cutter bar at positions spaced transversely of the header with the disks being mounted on the cutter bar and including a drive arrangement for driven rotation of each of the ten cutter disks about respective generally upright axes spaced along the cutter bar, the respective upright axes of the ten cutter disks lying along a plane containing the upright axes;
each disk comprising a central hub fastened by a plurality of bolts lying in a hub circle and a shield plate carried by the central hub;
each disk being generally elliptical in plan to define a longer axis and a shorter axis across the disk and having mounted thereon at ends of the longer axis thereof a respective one of a pair of cutter blade such that rotation of the disk about its upright axis defines a cutting circle and causes a standing crop to be cut by the blades;
the header frame defining a discharge opening through which the cut crop is discharged;
the discharge opening being defined by two parallel, spaced end walls each lying in a vertical plane parallel to the forward direction with an opening between the two end walls;
a conditioning system comprising two parallel conditioner rolls defining a conditioning nip mounted within the discharge opening;
the conditioner rolls being coextensive so that each has an end at a respective one of the end walls;
each end of the header frame including:
 a first outermost one of the ten cutter disks mounted on the cutter bar outwardly of the discharge opening;
 a second next adjacent one of the ten cutter disks being mounted on the cutter bar with the vertical plane of the respective end of the discharge opening intersecting the hub circle of said second next adjacent one of the ten cutter disks;
 and a crop transfer impeller arrangement transferring the cut crop from the first disk to the discharge opening comprising only first and second impellers:
 the first impeller mounted on the first cutter disk and rotates therewith about the respective upright axis thereof;
 the second impeller mounted on an upper support above the second impeller so that the second impeller extends downwardly toward the second cutter disk, the second impeller being driven about an upright axis thereof in an inward direction;
 the first impeller being immediately adjacent the second impeller without an intervening transport element;
 wherein the second impeller has a peripheral edge located immediately adjacent the vertical plane;
 wherein the second impeller is of larger diameter than the first impeller;
 wherein the upright axis of the second impeller is behind the plane containing the upright axes;
and wherein a width of the discharge opening is greater than 110 inches.

2. The header according to claim 1 wherein the second disk has the upright axis thereof within 2.0 inches of the vertical plane.

3. The header according to claim 1 wherein the second impeller has a tangent to the peripheral edge thereof within 1.0 inches of the vertical plane.

4. The header according to claim 1 wherein the second impeller has a tangent to the peripheral edge thereof lying in the vertical plane.

5. The header according to claim 1 wherein the second impeller has a tangent to the peripheral edge thereof forward of a plane containing the upright axes of the disks.

6. The header according to claim 1 wherein the second impeller has a tangent to the peripheral edge thereof forward of an upright plane containing a front tangent to the hub circles.

7. The header according to claim 1 wherein the second impeller has the upright axis thereof overlying the second disk with a portion of the second impeller overlying the cutting circle of the first disk.

8. The header according to claim 1 wherein there is provided an upstanding rear wall behind the first and second impellers which interconnects with the end wall of the discharge opening at a corner and wherein the rear wall includes a recessed portion behind the second impeller which is located rearward of a portion of the rear wall behind the first impeller.

9. The header according to claim 1 wherein each of the first and second impellers comprises a cylindrical wall with a plurality of angularly spaced ribs thereon parallel to the upright axis thereof.

10. The header according to claim 1 wherein the conditioning system comprising a transfer roll in front of the conditioning nip and parallel thereto mounted within the discharge opening.

11. The header according to claim 1 wherein the cutter disks provide a total cutting length along the cutter bar of 16 feet.

12. The header according to claim 1 wherein a width of the discharge opening is greater than 110 inches.

13. The header according to claim 1 wherein a width of the discharge opening is greater than 125 inches.

14. The header according to claim 1 wherein a width of the discharge opening is in the range 120 to 130 inches.

15. The header according to claim 1 wherein a width of the discharge opening is of the order of 129 inches.

* * * * *